United States Patent
Guerin et al.

(10) Patent No.: US 6,763,152 B2
(45) Date of Patent: Jul. 13, 2004

(54) OPTICAL FIBER EQUIPMENT WITH A BRAGG GRATING TUNABLE BY A PIEZOELECTRIC ACTUATOR

(75) Inventors: Jean Jacques Guerin, Massy (FR); Isabelle Riant, Orsay (FR)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 10/193,311

(22) Filed: Jul. 12, 2002

(65) Prior Publication Data

US 2003/0021512 A1 Jan. 30, 2003

(30) Foreign Application Priority Data

Jul. 24, 2001 (EP) ............................................ 01440235

(51) Int. Cl.[7] .............................. G02B 6/34; G02B 6/36
(52) U.S. Cl. ............................ 385/10; 385/37; 385/137
(58) Field of Search ............................... 385/10, 12, 13, 385/15, 27, 37, 39, 99, 134, 137

(56) References Cited

U.S. PATENT DOCUMENTS

| 5,469,520 A | * | 11/1995 | Morey et al. ................. 385/37 |
| 5,889,901 A | | 3/1999 | Anderson et al. |
| 6,156,145 A | | 12/2000 | Clark |
| 6,169,829 B1 | * | 1/2001 | Laming et al. ................ 385/37 |
| 6,563,970 B1 | * | 5/2003 | Bohnert et al. ................ 385/13 |

FOREIGN PATENT DOCUMENTS

| EP | 0 855 608 A1 | 7/1998 |
| EP | 1 063 546 A1 | 12/2000 |
| EP | 1 081 881 A2 | 3/2001 |
| WO | WO 99/44026 | * 9/1999 ............. G01L/9/00 |

OTHER PUBLICATIONS

Kim Se Yoon et al.: "Channel–switching active add/drop mulitplexer with tunable gratings" Electronics Letters, IEE Stevenage, GB, vol. 34, No. 1, Jan. 8, 1998, pp. 104–105.
Ohn M M et al.: "Dispersion variable fibre Bragg grating using a piezoelectric stack" Electronics Letters, IEE Stevenage, GB vol. 32, No. 21, Oct. 10, 1996, pp. 2000–2001.
Richter A et al: "Passive temperature compensation of piezo–tunable fibre Bragg gratings" Electronics Letters, IEEE Stevenage, GB, vol. 35, No. 15, Jul. 22, 1999, pp. 1269–1271.

* cited by examiner

*Primary Examiner*—John D. Lee
(74) *Attorney, Agent, or Firm*—Moser, Patterson & Sheridan, L.L.P.

(57) ABSTRACT

The present invention proposes optical fiber equipment having a Bragg grating tunable by a piezoelectric actuator, the equipment comprising an optical fiber, a Bragg grating photoinduced in said fiber, a support for supporting said fiber and comprising two uprights at opposite ends of said Bragg grating, each upright having a first holding element for holding said fiber, and a piezoelectric actuator held via its ends between the two uprights, said actuator being longitudinally prestressed in compression between said uprights.

10 Claims, 3 Drawing Sheets

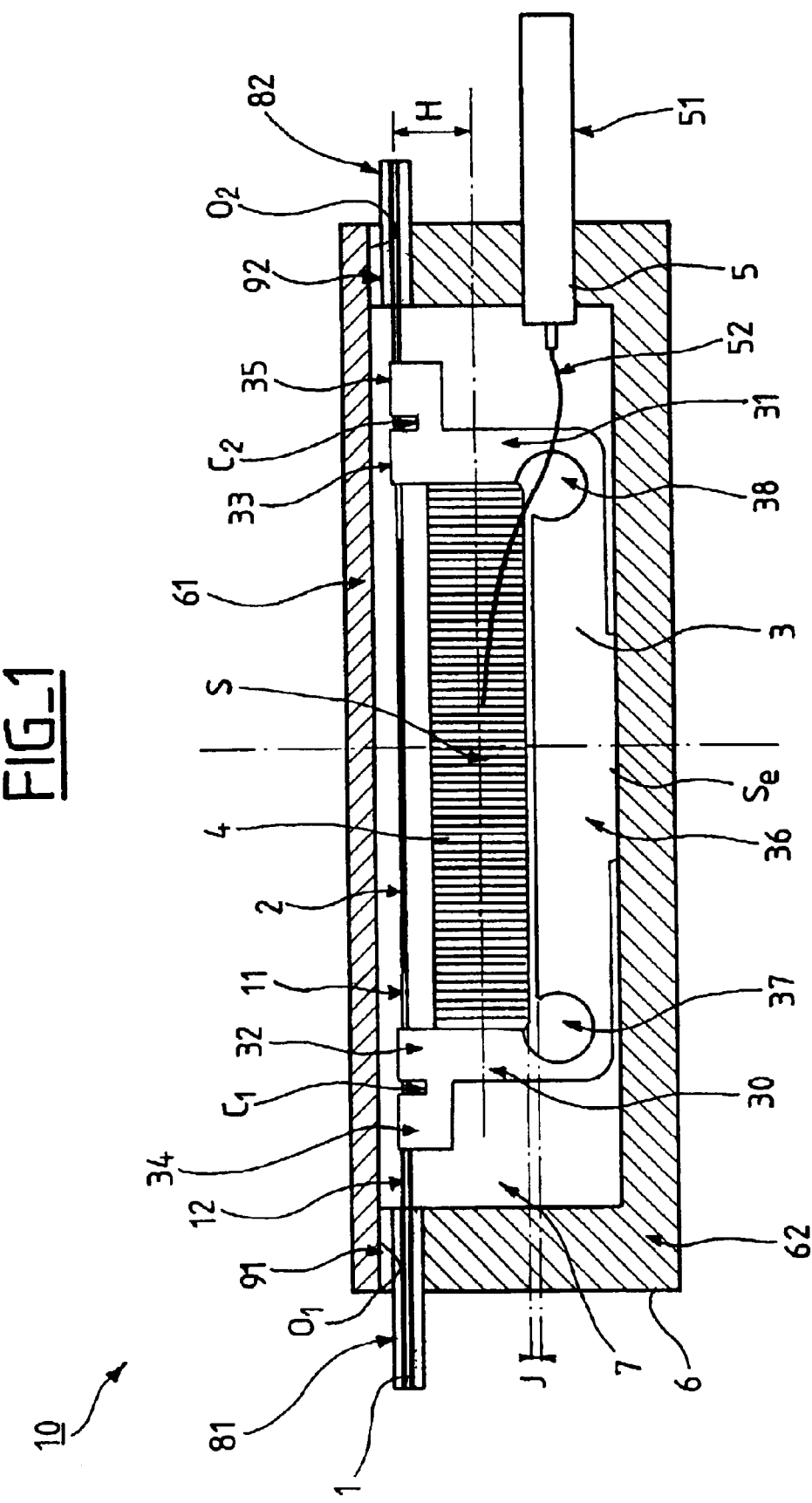
FIG_1

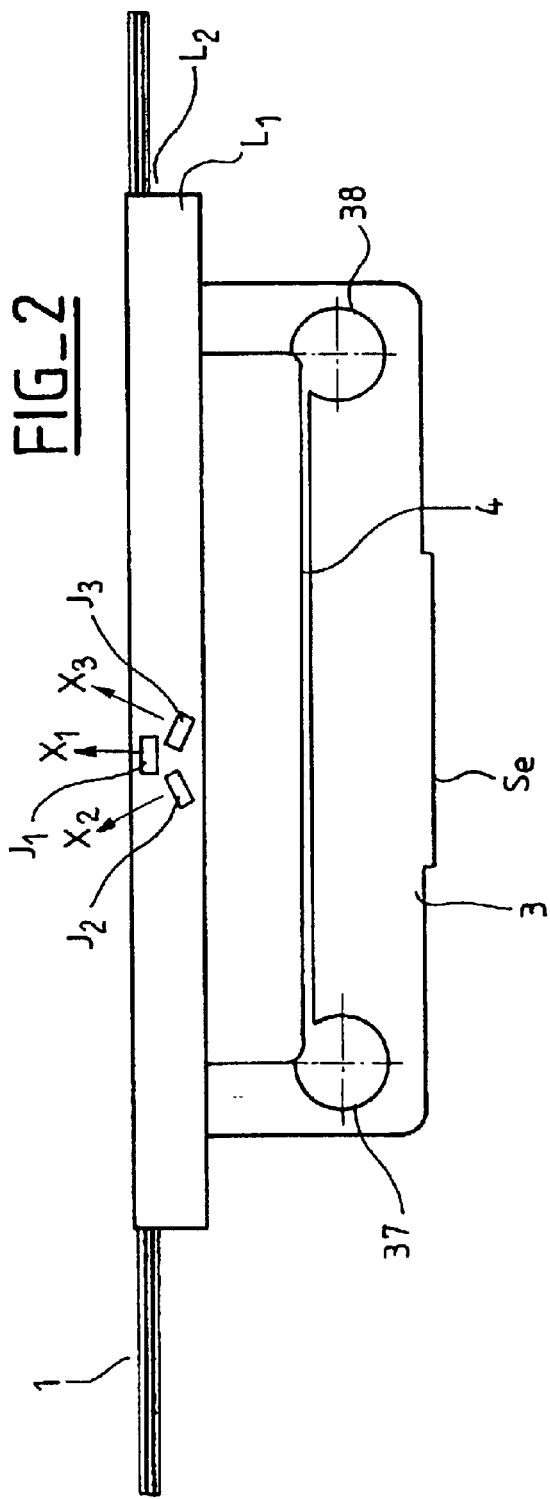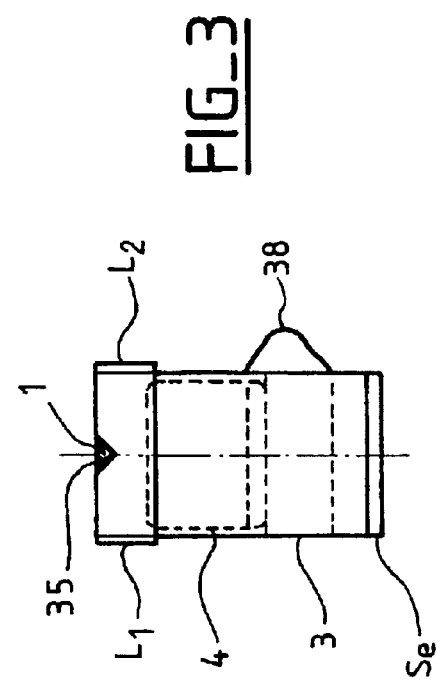

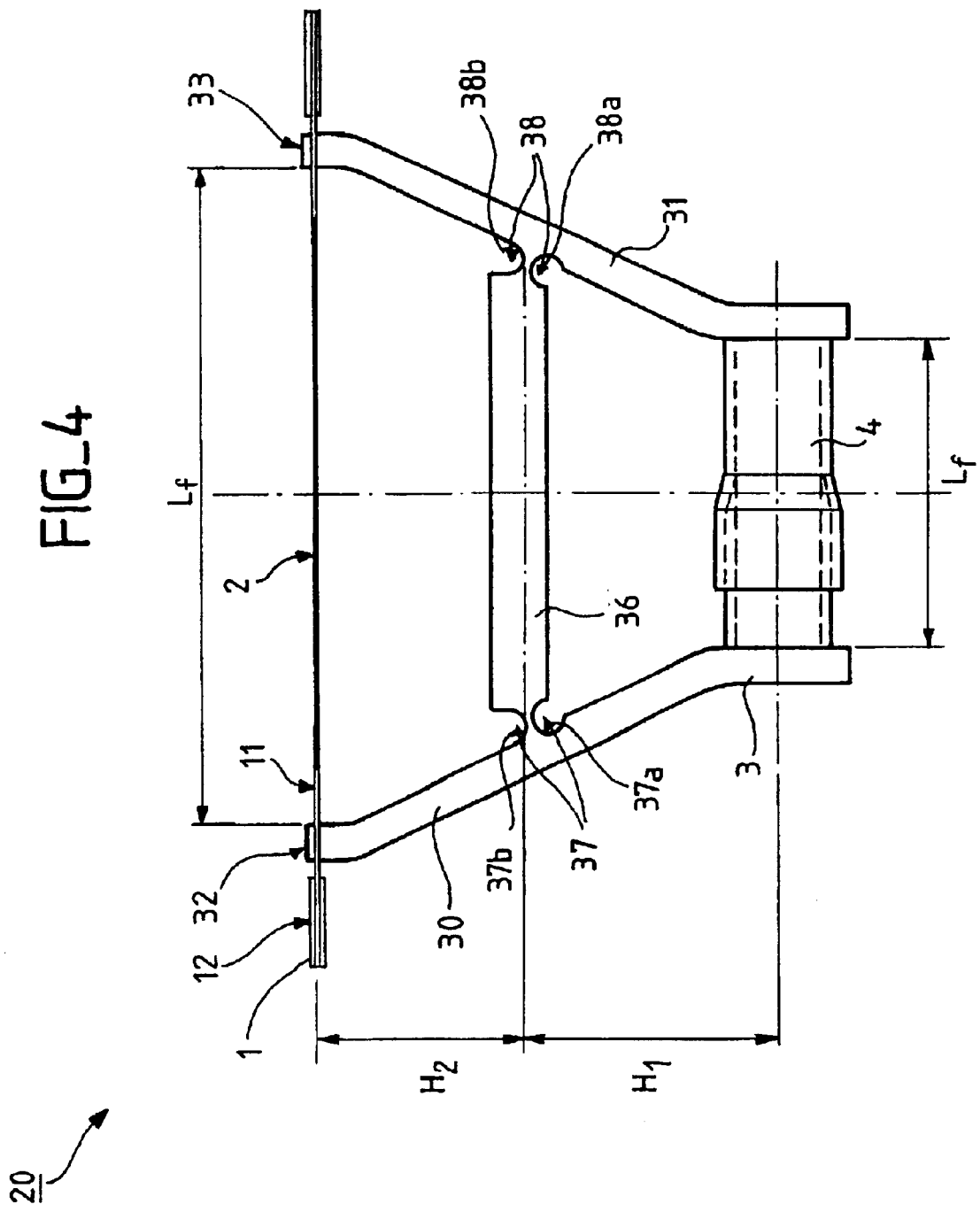

OPTICAL FIBER EQUIPMENT WITH A BRAGG GRATING TUNABLE BY A PIEZOELECTRIC ACTUATOR

BACKGROUND OF THE INVENTION

The invention relates to the field of wavelength division multiplex (WDM) optical transmission systems, and more particularly to optical fiber equipment having a Bragg grating tunable by a piezoelectric actuator.

The invention is based on a priority application EP 01 440 235.8 which is hereby incorporated by reference.

Attempts are being made to increase the capacity of WDM type systems, and indeed of dense WDM (DWDM) type systems, by increasing the data rate of each channel and/or by increasing the number of channels in the transmission windows, while nevertheless avoiding detection errors as caused for example by the data transmitted in the channels being deformed because of chromatic dispersion or temperature drift of the transmission line when subjected to a varying climatic environment.

Thus, in the prior art, wavelength-selective optical filters such as Bragg gratings are used, for example, for optical routing purposes in order to add or extract wavelengths by means of an optical add-drop multiplexer (OADM) or an optical cross-connect (OXC) unit.

In addition, wavelength-tunable Bragg gratings make it possible to select one channel or another channel, for example, as a function of the wavelength to be passed, or to tune onto a channel or between two channels so as to allow the system to pass light or prevent it from passing light. Bragg gratings are also used for compensating the chromatic dispersion of the various channels of a transmission line. Bragg gratings are temperature compensated if they are exposed to a varying climatic environment.

A Bragg grating is photoinduced in the core and/or in one or more layers of cladding in an optical fiber, and it comprises substantially periodic modulation of the refractive index in the core and/or in one or more layers of cladding of the fiber in the presence of photosensitive dopants. The pitch of the grating, i.e. its modulation period along the fiber, determines the spectral response of the grating which is centered around a wavelength known as the "Bragg wavelength". With a piezoelectric actuator, it is possible to modify the pitch along the fiber and thus to modify the Bragg wavelength so as to counter the problems mentioned above. An actuator comprises a stack of piezoelectric layers individually connected to pairs of electrodes and electrically insulated from one another, the layers being stuck together.

European patent application EP 0 855 608 discloses an embodiment of optical fiber equipment having a Bragg grating tunable by a piezoelectric actuator. In that equipment, the piezoelectric actuator is fixed mechanically via the ends of its stack to an optical fiber support having two uprights, each having a fiber-holding element. When a voltage is applied to the actuator, it lengthens longitudinally under the effect of axial stress which is transferred to the Bragg grating via the two uprights of the support. As a result, the Bragg grating is subjected to the same elongation as the actuator.

In that configuration, the piezoelectric actuator is not restrained sufficiently at its ends. When a voltage pulse is applied, the actuator is subjected temporarily to an overshoot stage: it begins by lengthening beyond the elongation appropriate for the applied voltage and it then shrinks and reaches the appropriate elongation only after a period during which it oscillates. This excess elongation generates vibration and mechanical stresses that damage the layers of the actuator which can suffer irreversible microfractures within the stack of layers, thereby permanently degrading the response of the piezoelectric actuator. In addition, these stresses are communicated to the Bragg grating, thus spoiling its spectral response. In addition, these instabilities increase the switching time of the equipment, i.e. the time necessary for adjusting the spectral response of the Bragg grating as a function of events.

SUMMARY OF THE INVENTION

An object of the present invention is to implement optical fiber equipment having a Bragg grating tunable by a piezoelectric actuator that has switching time that is shorter than in the prior art, that is reliable, and that is strong, thereby increasing its lifetime, particularly by greatly reducing overshoot. The cost of the equipment is also low, it is simple to manufacture, and its dimensions are as small as possible.

To this end, the present invention provides optical fiber equipment having a Bragg grating tunable by a piezoelectric actuator, the equipment comprising an optical fiber, a Bragg grating photoinduced in said fiber, a support for said fiber, the support having two uprights at opposite ends of said Bragg grating and each upright having a first holding element for holding said fiber, and a piezoelectric actuator held via its ends between the two uprights, the equipment being characterized in that said actuator is prestressed longitudinally in compression by said uprights.

The equipment of the invention thus has an actuator mounted in a prestressed condition on initial assembly by means of the uprights of the support. This prestress is applied and adjusted by selecting a distance between the uprights at the actuator which is shorter than the length of the actuator. With the actuator compressed in this way, the excess elongation of the actuator during an overshoot stage is practically zero.

In addition, practically eliminating overshoot duration has the effect of reducing switching time. Furthermore, the reduction in switching time provided by the invention avoids activating the resonant modes of the support which are sources of vibration and which consequently interfere with the spectral response of the Bragg grating.

The compression created needs to be adjusted depending on the type of piezoelectric actuator. The initial compression must not prevent the actuator from lengthening when subjected to a voltage. With increasing prestress force, the extent to which the piezoelectric actuator lengthens decreases, and consequently the tuning range decreases. If the prestress force decreases, then the extent to which the piezoelectric actuator can lengthen increases and consequently the tuning range increases. A compromise must be found between a suitable tuning range and minimizing switching time.

After maximum elongation corresponding to maximum operating voltage, the compression state of the actuator must not be too great. The pre-loaded support is preferably made from a material of stiffness and elastic limit such that the elongation of the piezoelectric actuator is properly transferred to the fiber. The thermal expansion coefficient of this material must also be small so that variation in the temperature of the assembly has little influence on the initial prestress state, and so that temperature drift of the assembly is minimized.

Furthermore, the equipment of the invention makes it possible to achieve a phenomenon whereby the deformation of the optical fiber is amplified, thereby increasing the tunability of the Bragg grating of the invention.

Advantageously, the prestress that is created can be substantially less than or equal to half the null force of the actuator.

The null force of the actuator is defined as follows. When the maximum operating voltage is applied to an actuator that is not subjected to an external force, then maximum elongation is obtained. This elongation decreases with increasing external force exerted on the ends of the actuator starting from said state. The null force is defined as the force above which elongation of the actuator becomes zero.

In the invention, the actuator is subjected to compression via the uprights of the support before any voltage is applied. To minimize mechanical damage to the actuator, the amount of prestress that is created is advantageously selected to be less than or equal to half the null force of the actuator.

The support of the invention can be made of a material based on iron and on nickel.

This type of material presents mechanical properties that are suitable for the invention. Stiffness is sufficient but not too large, so it is possible for the support to deform, while elastic limit is high so that deformation remains within the reversible range. In addition, the coefficient of thermal expansion can be selected to be small in the temperature range extending from −100° C. to +200° C.

In a preferred embodiment, the support of the invention includes a cross-member disposed perpendicularly between the two uprights and holding them together.

The support comprising the two uprights and the cross-member is constituted by a single piece. The cross-member reinforces the structure of the support with stiffness that is infinite at its center.

In this embodiment, the support can have a plurality of recesses disposed at the intersections between the cross-member and the two uprights.

Such recesses reduce the stiffness of the support, thereby allowing it better flexibility. The recesses can thus be used to adjust the value of the prestress so as to allow the actuator to move over its entire operating range. When a voltage is applied, the actuator lengthens and the uprights move apart and pivot about centers of rotation disposed within the recesses. Adding such recesses thus reinforces the phenomenon whereby displacement of the optical fiber is amplified. Depending on the position of the cross-member, this displacement of the fiber can be in the same direction or in the opposite direction to the deformation of the actuator.

In one configuration of this embodiment, the cross-member is placed at the ends of the two uprights opposite from their ends carrying the first holding elements, the support being U-shaped and the actuator being disposed above the cross-member.

The cross-member then serves to stabilize the support.

In this configuration, the cross-member can have a base including a portion of extra thickness substantially centered in its middle. This portion of extra thickness serves firstly to provide better pivoting of the two uprights during displacement of the piezoelectric actuator, and secondly to fix the assembly securely to its mounting plane.

In addition, in this configuration, elongation of the actuator gives rise to elongation of the optical fiber containing the Bragg grating. Thus, by means of this elongation, the Bragg wavelength of the grating increases.

In another configuration of this embodiment, the cross-member is disposed between the actuator and the optical fiber, so that the support is H-shaped.

In addition, in this other configuration, when the piezoelectric actuator lengthens, the optical fiber containing the Bragg grating shortens. Thus, when the piezoelectric actuator lengthens, the Bragg wavelength of the grating decreases.

Furthermore, the height between the horizontal axis of the cross-member and the horizontal axis of the optical fiber, and the height between the horizontal axis of the cross-member and the height of the actuator can both be selected as a function of the characteristics of the piezoelectric actuator and of the desired tuning range.

In this other configuration, the equipment of the invention can be insensitive to temperature.

This is achieved by suitably selecting the coefficients of thermal expansion of the materials of the actuator and of the support. In this manner, any temperature fluctuation is automatically compensated by the cross-member deforming appropriately.

In addition, each upright of the invention can have a second fiber-holding element disposed adjacent to its first holding element on its side remote from the Bragg grating.

An optical fiber comprises a core and one or more layers of cladding all made of a rigid material of silica type, and surrounded by a more flexible outer coating made of a material of polymer type. At the first holding elements and also between them, the optical fiber of the invention need not have an outer coating so that the fiber can be held firmly in order to transmit thereto all of the deformation imparted by the support during displacement of the piezoelectric actuator, and consequently impart elongation to the Bragg grating. These first holding elements are fixed either by adhesive or by soldering directly to the cladding of the fiber in order to be able to communicate all of the deformation of the actuator to the optical fiber.

The second holding elements on the outsides of the two uprights strengthen the output leads optical fiber in order to prevent it being torn away. These two holding elements are fixed by adhesive to the coating of the fiber and they are spaced far enough apart from the first holding elements to avoid the chemical components of the fixing means diffusing into one another.

Advantageously, the equipment of the invention can have a plurality of strain gages associated with a servo-control loop for controlling deformation of the support.

The strain gages, e.g. three strain gages arranged in a star or a delta configuration, serve to measure deformation of the support and thus monitor lengthening of the actuator. By associating them in a servo-control loop providing feedback to the electrical feed to the piezoelectric actuator, these strain gages serve to correct for hysteresis in the response of the actuator to an applied voltage, and thus to obtain elongation that depends linearly on the applied voltage. In addition, this association can correct for possible temperature drift of the Bragg grating.

BRIEF DESCRIPTION OF THE DRAWINGS

The characteristics and objects of the present invention appear from the following detailed description given purely by way of non-limiting illustration and with reference to the accompanying figures.

In the figures:

FIG. 1 is a section view through optical fiber equipment having a Bragg grating tunable by a piezoelectric actuator and constituting a first embodiment of the invention;

FIG. 2 is a fragmentary side view of the FIG. 1 equipment, with its housing and its electrical feed means removed;

FIG. 3 is an end view of the FIG. 2 equipment (seen from the right-hand side of FIG. 2); and FIG. 4 is a section view through optical fiber equipment having a Bragg grating tunable by a piezoelectric actuator constituting a second embodiment of the invention, and shown with its housing and its electrical feed means removed.

In all of the figures, elements that are common, i.e. that perform the same function, are given the same references.

FIG. 1 shows optical fiber equipment having a Bragg grating tunable by a piezoelectric actuator 10 and comprising:

an optical fiber 1;

a Bragg grating 2 photoinduced in the fiber 1;

a U-shaped support 3 for the fiber 1, itself comprising:
  two uprights 30 and 31 at opposite ends of the Bragg grating 2, each having a respective first fiber-holding element 32, 33 and a second respective fiber-holding element 34, 35 placed on the outside of the first holding element 32, 33, i.e. on its side that is remote from the Bragg grating 2;
  a cross-member 36 extending perpendicularly between the ends of the two uprights 30, 31 opposite from their ends carrying the holding elements 32 to 35; and
  two part-circular recesses 37, 38 at the intersections between the cross-member 36 and the two uprights 30, 31;

a piezoelectric actuator 4 that is longitudinally prestressed in compression, the actuator comprising a stack of piezoelectric layers, each piezoelectric layer s being connected to a respective pair of electrodes (not shown); the actuator is held at the ends of the stack between the two uprights 30, 31 and it is placed above the cross-member 36;

electrical feed means 5 comprising a voltage source 51 and an electrical connection 52 associated with the pairs of electrodes of the piezoelectric layers s; and a housing 6 comprising a cover 61 and a box 62 in which the smaller-sized support 3 is fixed so as to leave a gap 7 between the support 3 and the sides of the box 62.

The optical fiber 1 comprises a core with one or more layers of silica cladding 11, and it is surrounded by an outer coating of polymer 12. At the first holding elements 32, 33, and between them, the optical fiber 1 does not have an outer coating 12, so as to obtain better deformation of the Bragg grating 2. The first holding elements 32, 33 are fixed directly to the cladding 11 of the fiber 1 by adhesive or solder so as to be able to communicate the deformation of the actuator 4 to the optical fiber 1. The second holding elements 33, 34 strengthen the leads of the optical fiber 1 so as to prevent it being torn away. These holding elements are secured to the outer coating 12 of the fiber 1 by adhesive and they are spaced apart from the first holding elements 32, 33 by respective channels $c_1$, $c_2$ to prevent the chemical components of the fixing means migrating.

In addition, the optical fiber 1 passes through two openings $O_1$, $O_2$ between the box 62 and the cover 61 of the housing. In the vicinity of each of the openings $O_1$ and $O_2$, the optical fiber 1 also has a protective sheath 81, 82 in the form of a hollow tube surrounding its outer coating 12 and serving to avoid weakening the optical fiber 1. The sheaths 81, 82 are fixed to the cover 61 e.g. by adhesive 91, 92. The fiber 1 is fitted to the support 3 with initial tension of about 1 Newton (N). This tension serves to guarantee that the grating 2 is always in extension, in particular during any variations in the temperature of the equipment 10.

The support 3 is a single piece of Invar® (registered trademark), a material based on iron and nickel, with its elastic limit being equal to 310 megapascals (MPa), a thermal expansion coefficient of $10^{-6}$ per kelvin ($K^{-1}$), and a modulus of elasticity equal to 140,000 MPa. After being machined, the support 3 is annealed to reduce residual tensions. The outer edges of the uprights 30, 31 resting on the box 62 are rounded and radii of curvature are provided on the outsides of the recesses 37, 38 so as to minimize the effects of stress peaks and thus of stress concentrations during lengthening of the piezoelectric actuator 4. In addition, the cross-member 36 has a base which includes a region Se of extra thickness that is substantially centered in the middle thereof, serving firstly to allow the two uprights 30, 31 to pivot when displacement is applied by the piezoelectric actuator 4, and secondly to fix the structure securely to the box 62.

The prestress created by the support 3 on the actuator 4 is about 100 N for an actuator 4 having a null force of about 200 N. By way of example, the actuator 4 can be fixed to the uprights 30 and 31 by adhesive for better positioning. Under such circumstances, care is taken to ensure that the adhesive is applied substantially uniformly over the entire vertical contact area. In addition, the actuator 4 presents clearance J equal to about 0.25 millimeters (mm) between the actuator and the cross-member 36. This clearance J enables the actuator 4 to lengthen over its entire length and avoids mechanical damage due to the friction that would arise on making contact with the cross-member 36.

When a voltage is applied by the means 5, the actuator 4 lengthens, and the uprights 30, 31 splay apart, pivoting about centers of rotation corresponding to the centers of the circular recesses 37 and 38. This makes it possible to achieve net amplification of the displacement of the fiber 1 compared with the displacement of the piezoelectric actuator 4. By varying the distance H between the horizontal axis of the piezoelectric actuator 4 and the horizontal axis of the fiber 1, it is possible to increase or decrease lengthening of the fiber and thus to vary the tuning range of the Bragg grating 2.

By way of example, for an actuator 4 presenting maximum deformation selected to be equal to 17 micrometers ($\mu$m) when subjected to about 150 volts (V), the optical fiber 1 lengthens by about 52 $\mu$m when the height H is 3 mm, so the Bragg wavelength of the grating 2 is offset by about 1.7 nanometers (nm).

With the equipment 10, switching time is reduced by an amount lying in the range about 0.12 microseconds (ms) to about 0.18 ms.

The equipment 10 is small in size, having dimensions substantially of 40 mm×10 mm×10 mm.

FIG. 2 is a fragmentary side view of the equipment 10 of FIG. 1 with its housing 6 and its electrical feed means 5 removed.

In addition to showing the optical fiber 1, the U-shaped support 3 with two recesses 37, 38 and a portion Se of greater thickness, and the actuator 4, this figure also shows three strain gages $J_1$, $J_2$, and $J_3$ placed in a multi-directional configuration on a first strip $L_1$ fixed to one side of the top portion of the support 3. A second strip $L_2$ identical to the strip $L_1$ is fixed to the other side of the top portion of the support 3 so that the equipment 10 is balanced about the axis of the optical fiber 1.

The three strain gages $J_1$, $J_2$, and $J_3$ measure deformation of the support along three respective axes $X_1$, $X_2$, and $X_3$. These strain gages are connected to a servo-control loop (not shown) for linearizing the lengthening of the piezoelectric actuator 4 in response to voltage. In addition, this configuration can be used to correct possible temperature drift of the Bragg grating (see FIG. 1).

FIG. 3 is an end view of the equipment shown in FIG. 2, seen from the right-hand side of FIG. 2;

There can be seen the optical fiber 1 fixed to the second holding element 35 of the support 3, one of the recesses 38, the region of extra thickness Se, and the strips $L_1$ and $L_2$ on either side of the support 3.

FIG. 4 is a section view through optical fiber equipment 20 having a Bragg grating tunable by a piezoelectric actuator constituting a second embodiment of the invention, the equipment being shown with its housing and its electrical feed means removed.

The equipment 20 comprises:

an optical fiber 1;

a Bragg grating 2 photoinduced in the fiber 1;

a support 3 for the fiber 1, the support being H-shaped and comprising:

two uprights 30 and 31 on either side of the Bragg grating, each having a first fiber-holding element 32, 33;

a cross-member 36 disposed transversely and spaced apart from both ends of the two uprights 30, 31; and two pairs of partially circular recesses 37, 38, each pair comprising two recesses 37a & 37b or 38a & 38b located where the cross-member member 36 intersects a respective one of the two uprights 30, 31; and a piezoelectric actuator 4 which is longitudinally prestressed in compression, being held at the ends of a stack of layers (not shown) between the two uprights 30 and 31 and being disposed beneath the cross-member 36.

The optical fiber 1 has a core with one or more layers of silica cladding 11 and surrounded by an outer coating 12 of polymer. Between the first holding elements 32, 33 the optical fiber 1 does not have an outer coating 12 SO as to enable the Bragg grating 2 to be deformed better. The first holding elements 32, 33 are fixed to the cladding 11 of the fiber 1 by adhesive or by solder in order to be able to communicate deformation of the actuator 4 to the optical fiber 1.

Each of the two uprights 30, 31 has a top portion of flared shape serving in particular to receive a length of optical fiber 1 that is longer than the actuator 4.

The prestress created by the pre-loaded support 3 on the actuator 4 is about 100 N for an actuator 4 having a null force of about 200 N. The actuator 4 can be fixed to the uprights 30, 31 by adhesive, for example, in order to improve positioning.

The length of the actuator 4 is written $L_p$, the length of the optical fiber 1 between the first holding elements 32 and 33 is written $L_f$. The distance between the horizontal axis of the actuator 4 and the horizontal axis of the cross-member 36 is written $H_1$. The distance between the horizontal axis of the optical fiber 1 and the horizontal axis of the cross-member 36 is written $H_2$. The variation $DL_f$ defining the tunability of the equipment 20 can be calculated by the following relationship:

$$\Delta L_f = -\frac{H_2}{H_1}\Delta L_p$$

By way of example, the height $H_1$ is about 9 mm and the height $H_2$ is about 13 mm.

The equipment 20 is made insensitive to temperature by appropriately matching the thermal expansion coefficient of the support material 3 to that of the actuator 4. Any temperature fluctuation is automatically compensated by matching deformation of the cross-member 36.

The equipment 20 is of small size, having substantially the following dimensions: 40 mm×40 mm×10 mm.

Naturally, the above description is given purely by way of illustration. Without going beyond the ambit of the invention, any means can be replaced by equivalent means.

In a variant of the first embodiment of the equipment of the invention as shown in FIG. 1, it is possible to replace the uprights by uprights in a flared configuration analogous to that of the second embodiment as shown in FIG. 4, thereby making it possible to include a length of optical fiber that is longer than the cross-member.

What is claimed is:

1. An optical fiber equipment having a Bragg grating tunable by a piezoelectric actuator, the equipment comprising an optical fiber, a Bragg grating photoinduced in said fiber, a support for said fiber, the support having two uprights at opposite ends of said Bragg grating and each upright having a first holding element for holding said fiber, and a piezoelectric actuator held via its ends between the two uprights, the equipment wherein said actuator is prestressed longitudinally in compression by said uprights; wherein said support includes a cross-member disposed transversely between the two uprights and holding them together.

2. The optical fiber equipment according to claim 1, wherein the applied prestress is substantially less than or equal to half the null force of said actuator.

3. The optical fiber equipment according to claim 1, wherein said support is made of a material based on iron and nickel.

4. The optical fiber equipment according to claim 1, wherein said support has a plurality of recesses disposed at the intersections between said cross-member and the two uprights.

5. The optical fiber equipment according to claim 1, wherein said cross-member is disposed at the ends of the two uprights opposite from their ends carrying said first holding elements, said support being U-shaped, and in that said actuator is disposed above said cross-member.

6. The optical fiber equipment according to claim 5, wherein said cross-member has a base including a region of extra thickness substantially centered in the middle thereof.

7. The optical fiber equipment according to claim 1, wherein said cross-member is disposed between said actuator and said optical fiber, said support being H-shaped.

8. The optical fiber equipment according to claim 7, wherein the optical fiber equipment is insensitive to temperature.

9. The optical fiber equipment according to claim 1, wherein the optical fiber equipment comprises a plurality of strain gages in association with a loop for servo-controlling deformation of said support.

10. An optical fiber equipment having a Bragg grating tunable by a piezoelectric actuator, the equipment comprising an optical fiber, a Braag grating photoinduced in said fiber, a support for said fiber, the support having two uprights at opposite ends of said Bragg grating and each upright having a first holding element for holding said fiber, and a piezoelectric actuator held via its ends between the two uprights, the equipment wherein said actuator is prestressed longitudinally in compression by said uprights; wherein each upright has a second holding element for holding said fiber, the second holding element being placed adjacent to the correspond first holding element on its side remote from said Bragg grating.

* * * * *